Sept. 30, 1958  L. L. STEVENS  2,854,075
SHAFT RETARDER
Filed Dec. 29, 1955  2 Sheets-Sheet 2
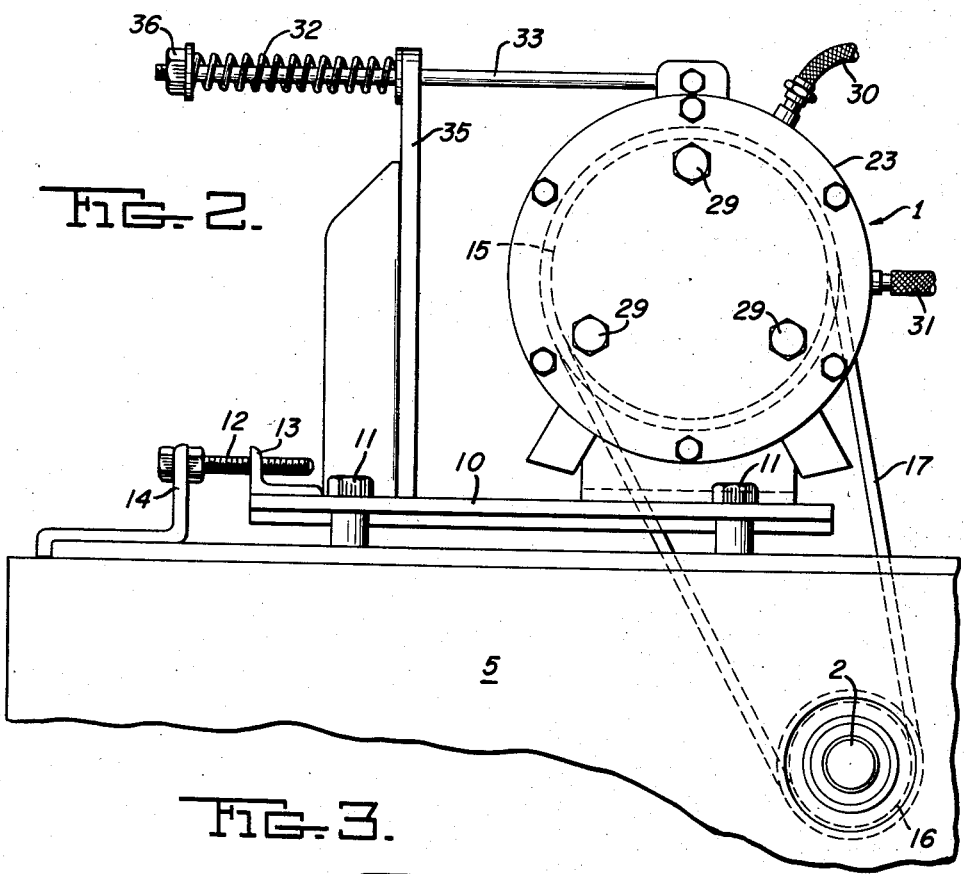
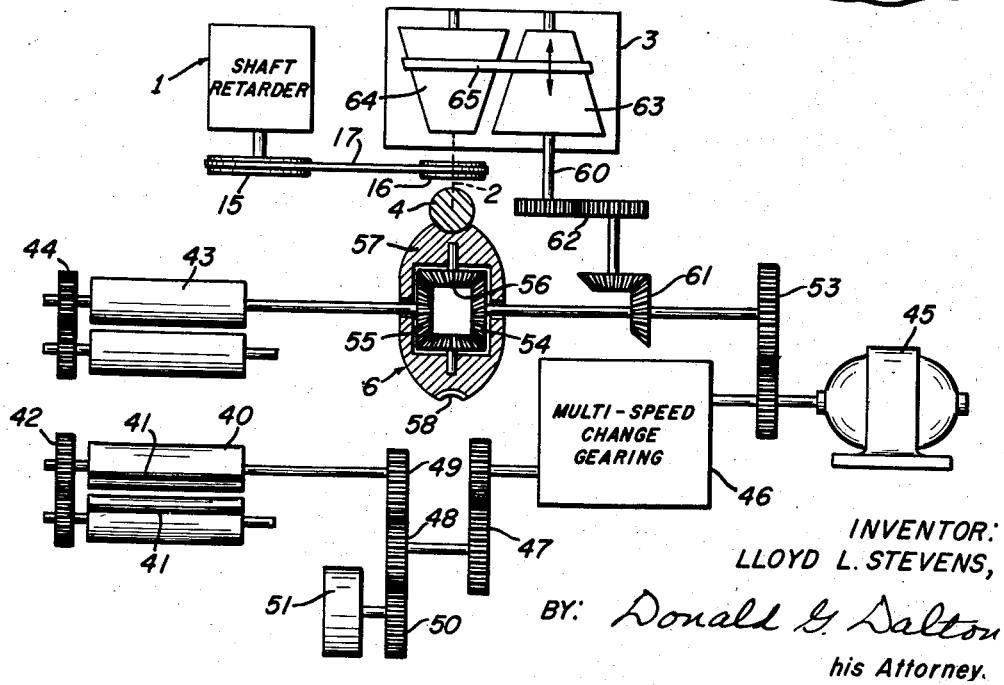
INVENTOR:
LLOYD L. STEVENS,
BY: Donald G. Dalton
his Attorney.

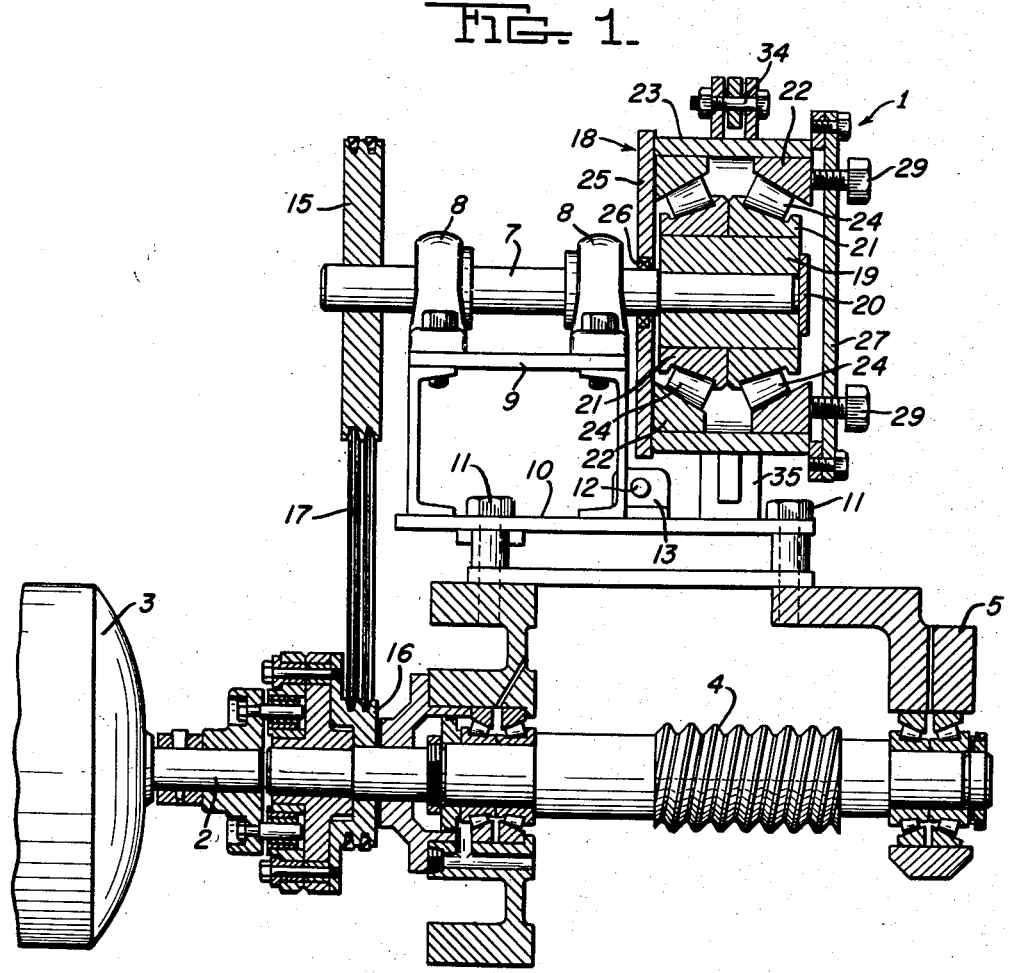

United States Patent Office 2,854,075
Patented Sept. 30, 1958

2,854,075

SHAFT RETARDER

Lloyd L. Stevens, Port Chicago, Calif., assignor to United States Steel Corporation, a corporation of New Jersey Application December 29, 1955, Serial No. 556,316

9 Claims. (Cl. 164—68)

This invention relates to an attachment for applying a retarding or braking torque to a shaft or other rotating part of a mechanical drive which is subject to intermittently applied loads. More particularly, and in accordance with a preferred embodiment of the invention, the braking attachment of this invention is applied to a flying shear drive for the purpose of reducing variations in length of sheets being sheared from strip in a continuous tinning line.

A mechanical drive comprised of plural gear trains and rotating shafts has an inherent flexibility which is the result of structural deflections in and between its operating parts particularly when subjected to abruptly and intermittently applied loads. Flexibility of this nature is particularly troublesome in drives which must maintain two or more components of an apparatus in synchronous operation. In such case, structural deflections in the drive produce an angular displacement of the apparatus components relative to each other and a momentary interruption of their synchronous operation. An angular displacement of this character between the feed rolls and the shearing knife drums of a flying shear causes variations in length of sheets being cut from strip fed to the knife drums by the feed rolls. This invention has, accordingly, as one of its more specific objects, the provision of an attachment for reducing variations in length of sheets cut by a flying shear. As a further and more principal object, this invention is directed to the problem of reducing relative angular displacement between parts or components of a mechanical drive which would otherwise result from abruptly applied loads. These and related objects are effected by applying in a manner to be described a braking or retarding torque to a shaft or other rotating part of the drive.

Another object of this invention is to provide an attachment for retarding and applying a braking load to a mechanical drive which comprises a shaft having a connection with the drive for rotation thereby and a unit for applying a drag load to the shaft. A still further object of this invention is to provide an attachment braking unit of the character just referred to in the form of a thrust bearing assembly on the shaft which includes means for varying its bearing pressure and thereby its frictional braking torque to rotation of the shaft.

Other objects and advantages of the invention will be apparent from the following description.

In the drawings, there is shown a preferred embodiment of the invention. In this showing:

Figure 1 is a sectional view of the shaft retarding unit of this invention which shows its application to the flying shear drive illustrated diagrammatically in Figure 3;

Figure 2 is an end elevational view looking from the right of the retarding unit shown in Figure 1; and Figure 3 is a diagrammatic view of a flying shear drive having incorporated therein the retarding unit of this invention.

While Figure 3 shows a preferred embodiment of the invention as applied to a conventional flying shear, it will be understood that the principles of the invention have general application in connection with other types of mechanical drives and that such other applications are contemplated. In the showing of Figure 3, the shaft retarder unit of this invention is designated as a whole by the numeral 1 and is applied in a manner to be described to the output shaft 2 of a speed control unit 3 which in a manner to be described controls the length of sheets cut from strip delivered, for example, from a continuous tinning line. As best shown in Figures 1 and 2, the output shaft 2 of the speed control unit 3 drives a worm pinion 4 which is rotatably supported in a gear housing 5 of a differential gear, designated as a whole by the numeral 6 in Figure 3, for a purpose to be described. A description of the structure of the speed control unit 3 and the differential gear 6 will be given in greater detail below together with an explanation of the manner in which the shaft retarder unit 1 affects operation of the flying shear drive shown in Figure 3.

The retarding unit 1 of this invention, as shown in Figures 1 and 2, comprises a shaft 7 which is rotatably supported by bearings 8. The bearings 8 are mounted by a bracket assembly 9 on a plate 10 which is secured to the differential gear housing 5 by bolts 11. The openings (not shown) through which the bolts 11 extend are elongated so that the plate 10 may be adjusted from right to left in the plane of Figure 2 of the drawings. An adjustable screw 12 has engagement with a bracket 13 secured to the bracket plate 10 and a bracket 14 secured to the gear housing 5 for adjusting the lateral position of the unit 1 as viewed in Figure 2.

The shaft 7 has a drive connecting it with the output shaft 2 for rotation thereby. This drive comprises a pulley 15 keyed to the shaft 7, a pulley 16 keyed to the shaft 2, and a drive belt 17 trained over the pulleys 15 and 16.

A bearing assembly, designated as a whole by the numeral 18, is applied to the shaft 7 for developing a frictional braking or retarding torque which resists its rotation by the shaft 2. The bearing assembly 18 comprises a sleeve 19 which has a keyed connection with the shaft 7. A keeper plate 20 is bolted to the end of the shaft 7 for maintaining the axial position of the sleeve 19. The sleeve 19 has a pressed fit within the inner races 21 of a pair of thrust roller bearing assemblies which respectively have their outer races 22 frictionally engaged with the internal surface of a cylindrical housing 23 for rotation therewith. Tapered roller bearings 24 are mounted between the races 21 and 22. The inner end of the housing 23 is closed by an end plate 25 which has a central opening through which the shaft 7 extends, a packing 26 being provided about the shaft 7 to seal one end of the housing 23 against leakage of oil. A cover plate 27 is bolted to the other end of the housing 23 to complete an enclosure about the thrust roller bearings therein. A plurality of bolts 29 are threaded in openings in the plate 27 and have their inner ends engaged with the edge of one of the outer races 22. The relative axial positions of the outer races 22 with respect to their inner races 21 may be adjusted by operating the bolts 29 and such an adjustment in turn varies the pressure of the roller bearings 24 against the inner and outer races 21 and 22 and changes the frictional torque applied to the shaft 7. Conduits 30 and 31 have connections to the interior of the housing 23 for circulating cooling oil therethrough.

Rotation of the housing 23 by frictional forces generated due to rotation of the shaft 7 is resiliently resisted by a spring 32 mounted on a rod 33. The rod 33 has a pivotal connection at 34 (Figure 1) with the housing 23 and extends through an opening in a stationary bracket 35. The spring 32 has one end bearing against the bracket 35 and its other end bearing against a nut 36 secured on the outer end of the rod 33. In this manner, the spring 32 provides a resilient bias which resists rotation of the housing 23 in a clockwise direction as viewed in Figure 2.

From the foregoing, it will be apparent that the bearing assembly 18 is effective to apply a frictional drag or retarding torque which resists rotation of the shaft 7. The braking action applied to the shaft 7 of course may be regulated by adjusting the bolts 29 to vary the pressure of the roller bearings 24 against the inner and outer races 21 and 22. This braking effort is applied to and resists rotation of the shaft 2 through the belt drive connection between the shafts 7 and 2.

In the flying shear drive shown diagrammatically in Figure 3, the numeral 40 designates a pair of superimposed knife drums which respectively mount shearing knives 41. Gears 42 connect the drums 40 for simultaneous rotation so that a drive applied to one of the drums will be effective to rotate both. A pair of superimposed pinch or measuring rolls 43 feed strip to the knife drums 40. The rolls 43 are connected by gears 44 for simultaneous rotation and, in practice, the rolls 43 form part of a set of leveller rolls which receive the strip, for example, from a tinning line. The length of sheets cut from the strip in this manner is dependent upon the relative speeds of the leveller or feed rolls 43 and the knife drums 40.

A common motor 45 is provided for rotating the rolls 43 and knife drums 40. The knife drums 40 are driven from the motor 45 through a multi-speed change gearing 46, a gear train 47, and an elliptical gear train comprised of a drive gear 48 and a driven gear 49, the driven gear 49 having direct driving connection with one of the knife drums 40. The elliptical gear train includes a second driven gear 50 which actuates a fly wheel 51 for counterbalancing the forces reacting through the driven gear 49 from a shearing operation. For any given speed of the feed rolls 43, the drums 40 will cut sheets having a length dependent upon their speed of rotation as determined by the setting of the multi-speed change gearing 46 which in practice usually provides four different gear ratios between the motor 45 and the knife drums 40. The drive for the knife drums 40 is of course abruptly subjected to its maximum load when the knives 41 move into shearing engagement with the strip being cut thereby.

The feed rolls 43 are driven from the motor 45 through a gear train 53 and the differential gear 6 referred to above. The differential gear 6 comprises input and output bevel gears 54 and 55 which have meshing engagement with differential bevel gears 56 carried by a differential cage 57, the speed ratio of the gears 54 and 55 being determined by the rotational speed of the cage 57. The periphery of the cage 57 carries a worm gear 58 which has meshing engagement with the worm pinion 4 referred to above in connection with the description of Figure 1.

The speed of rotation of the cage 57 and thereby the speed of rotation of the feed rolls 43 may be adjusted by regulating the speed of rotation of the worm pinion 4. For this purpose, and as further indicated above, the worm pinion 4 is driven by the output shaft 2 of the speed control unit 3 which has an input drive shaft 60 which is driven from the motor 45 by the gear train 53, a set of beveled gears 61, and a gear train 62. The speed control unit 3 is a conventional mechanism, commonly referred to as a Reeves-type drive, providing an infinitely variable speed ratio of its output shaft 2 with respect to its input shaft 60, and is shown diagrammatically as comprising a conical input drum 63 connected to the input shaft 60 and a conical output drum 64 connected to the output shaft 2, motion being transmitted between the drums 63 and 64 by a belt 65 which is shiftable axially, in the direction indicated by the arrows, of the drums 63 and 64 to vary the speed ratio therebetween. In practice, the drums 63 and 64 have axially extending grooves (not shown) on their peripheral surfaces and the belt 65 is comprised of chain links (not shown) which have engagement in the drum grooves. By shifting the position of the belt 65, the speed of rotation of the output shaft 2 is changed to vary the speed of rotation of differential gear cage 57 and thereby the speed of rotation of the feed rolls 43. This speed adjustment of the rolls 43 is effective to vary the length of the sheets being cut by the drums 40 within limits determined by the setting of the speed change gearing 46.

Peak loading of the drive for the shearing knife drums 40 occurs at the instant when the shearing knives 41 make shearing contact with the strip. While the elliptical gear train 48—49 and the counterbalance provided by the gear 50 and flywheel 51 are intended to compensate for this abrupt application of load, the loading is reflected back through the drive. Due to the flexibility in the drives for the drums 40 and 43, structural deflections are produced in the various parts of such drives which change the relative speed ratio of the feed rolls 43 to the drums 40 and produce an angular displacement therebetween. This angular displacement in turn produces variations in length of the sheets being cut by the shear drums 40. The application of a drag load to one of the drives for the feed rolls 43 or drums 40 by the shaft retarder 1 of this invention has been found to reduce the structural deflection in the parts of the drive from peak loadings due to shearing action of the knives 41 and to correspondingly reduce variations in length of the sheets being cut.

For the additional purpose of reducing speed changes in the operation of the feed or levelling rolls 43 due to structural deflections and slippage in the speed control unit 3 resulting from the drag of the rolls 43 on the differential gear drive 6, it is preferred that the shaft retarder unit 1 be applied to the output shaft 2 of the speed control unit 3 as shown in Figure 3. Slippage in the unit 3 arises in part from the fact that its input shaft 60 is geared directly with the motor 45 and thus has a constant controlled speed while its output shaft, being connected to the differential 6, can have a variable speed. The load of the leveller or feed rolls 43 exerts a drag or resistance on the differential output gear 55 which has the effect of holding one side of the differential 6 and develops a back torque through the shaft 2 which tends to make the shaft 2 and pulley 64 run at greater speed than the input pulley 63 and shaft 60. Since the output shaft 2 is attempting to run at a greater speed than the input shaft 60, considerable torque is developed which causes slippage in the unit 3, and such slippage in turn causes the rolls 43 to run at too low a speed. While the unit 3 is in practice designed as a non-slip device by providing, as described above, grooves on the conical wheels 63 and 64 and a belt 65 in the form of a self-tooth-forming chain, slippage will occur when the torque on the output shaft 2 is large and particularly when the unit 3 is adjusted for its maximum speed increase. At this adjustment, the chain belt 65 is at the lower end of the pulley 64 and the chain must form exceedingly small but yet exact teeth. By adjusting the shaft retarder 1 so that it absorbs all of the back torque on the output shaft 2 developed by the drag of the rolls 43, slippage is eliminated and the unit 3 is no longer required to act as a brake but is allowed to perform its intended function of a speed regulator. While it is preferred that the retarder unit 1 be applied to the shaft 2 for the reasons given above, it will be understood that improved results will be obtained by its application to other parts of the drive and such applications are contemplated within the principles of this invention.

While one embodiment of my invention has been shown and described it will be apparent that other adapta-

I claim:

1. In a continuously operating mechanical drive subject to intermittently applied loads and including a rotating part, the combination with said drive of an attachment for reducing structural deflections in said drive in response to changing loads thereon comprising a shaft mounted for rotation, a pulley drive connecting said shaft with said drive part for rotation thereby, and means for applying a braking force to said shaft comprising a stationary housing arranged concentrically of said shaft, a thrust bearing assembly comprising an inner race connected to said shaft for rotation therewith, an outer race secured to said housing, and roller bearings between said inner and outer races, and means for adjusting the relative axial positions of said inner and outer races to vary the pressure of said bearings against said races and thereby the retarding torque applied to shaft.

2. The invention defined in claim 1 characterized by the provision of means for circulating a cooling fluid through said housing.

3. In a shearing apparatus including a pair of flying shears and a pair of feed rolls, a first drive means including a speed change gear transmission for rotating said shears, a second drive means including an infinitely variable speed change transmission for rotating said feed rolls, a common motor for operating both of said drive means, and means for continuously applying a retarding load to one of said drive means to reduce change in the relative rotational speeds of said shears and feed rolls in response to changing loads on said drive means.

4. The invention defined in claim 3 characterized by said load means being applied to said second drive means.

5. The invention defined in claim 3 characterized by said load means comprising a shaft, a bearing support for said shaft, a driving connection between said shaft and one of said drive means, and means for applying a retarding torque to said shaft.

6. The invention defined in claim 3 characterized by said load means comprising a shaft, a bearing support for said shaft, a driving connection between said shaft and one of said drive means, and means for applying a retarding torque to said shaft comprising a stationary housing mounted concentrically of said shaft, a thrust bearing assembly comprising an outer race secured to said housing, an inner race secured to said shaft for rotation therewith, and tapered roller bearings between said inner and outer races, and means for adjusting the axial position of said outer race relative to said inner race for varying the pressure of said roller bearings on said outer and inner races to thereby vary the retarding torque applied to said shaft.

7. In a flying shear for cutting strip into sheets, a pair of shear drums, a pair of feed rolls for feeding strip to said shear drums, a drive motor, a gear reduction drive connecting said motor with said shear drums, a second drive connecting said feed rolls with said motor, said second drive including an infinitely variable speed transmission comprising an input shaft, a gear drive connected with said motor for operating said shaft, an output shaft having a drive connection with said feed rolls, and a pair of oppositely tapered conical wheels with a drive belt therebetween movable axially of said wheels for varying the speed ratio of said input and output shafts, and means for applying a retarding load to said output shaft to absorb the torque developed by the load of said feed rolls thereon.

8. In a flying shear for cutting strip into sheets, a pair of shear drums, a pair of feed rolls for feeding strip to said shear drums, a drive motor, a gear reduction drive connecting said motor with said shear drums, a second drive for operating said feed rolls comprising a differential gear unit having an input gear operated by said motor, an output gear for operating said feed rolls, and differential means including a rotatable differential cage interconnecting said input and output gears, means controlling the differential speed of rotation of said cage comprising an infinitely variable speed change transmission having an output shaft, a gear drive connecting said output shaft with said cage, an input shaft, a gear drive connecting said input shaft with said motor, and a pair of oppositely tapered conical wheels with a drive belt therebetween movable axially of said wheels for varying the speed of said output shaft, and means for applying a retarding force to said output shaft for absorbing torque thereon developed by the drag of said feed rolls on said differential output gear.

9. In a mechanical drive, a rotatable load, a drive motor, and a drive rendering said motor operable to rotate said load comprising a differential gear unit having an input gear operated by said motor, an output gear for rotating said load, and differential means including a rotatable differential cage interconnecting said input and output gears, means controlling the differential speed of rotation of said cage comprising an infinitely variable speed change transmission having an output shaft, a gear drive connecting said output shaft with said cage, an input shaft, a gear drive connecting said input shaft with said motor, and a pair of oppositely tapered conical wheels with a drive belt therebetween movable axially of said wheels for varying the speed of said output shaft, and means for applying a retarding force to said output shaft for absorbing torque thereon developed by the drag of said load on said differential output gear.

References Cited in the file of this patent

UNITED STATES PATENTS

| | | |
|---|---|---|
| 1,963,753 | Mallina | June 19, 1934 |
| 2,201,581 | Hallden | May 21, 1940 |
| 2,211,418 | Hallden | Aug. 13, 1940 |
| 2,375,098 | Geczy | May 1, 1945 |
| 2,454,980 | Sobell | Nov. 30, 1948 |
| 2,479,285 | Williams | Aug. 16, 1949 |
| 2,572,265 | Johnson | Oct. 23, 1951 |